United States Patent
Oh et al.

(10) Patent No.: US 11,557,137 B2
(45) Date of Patent: Jan. 17, 2023

(54) SEMANTIC MAP PRODUCTION SYSTEM AND METHOD

(71) Applicant: KOREA INSTITUTE OF SCIENCE AND TECHNOLOGY, Seoul (KR)

(72) Inventors: Yoon Seon Oh, Seoul (KR); Ho Yeon Hwang, Seoul (KR); Sung Kee Park, Seoul (KR); Chang Joo Nam, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 17/410,824

(22) Filed: Aug. 24, 2021

(65) Prior Publication Data

US 2022/0156536 A1    May 19, 2022

(30) Foreign Application Priority Data

Nov. 17, 2020    (KR) .................. 10-2020-0153563

(51) Int. Cl.
  *G06V 30/262*    (2022.01)
  *G06K 9/62*    (2022.01)
  (Continued)

(52) U.S. Cl.
  CPC ......... *G06V 30/274* (2022.01); *G06K 9/6222* (2013.01); *G06K 9/6232* (2013.01);
  (Continued)

(58) Field of Classification Search
  CPC ...... G06V 30/274; G06V 20/10; G06V 20/64; G06K 9/6222; G06K 9/6232; G06K 9/253;
  (Continued)

(56) References Cited

U.S. PATENT DOCUMENTS

2019/0174149 A1*    6/2019    Zhang ................ H04N 21/2393

FOREIGN PATENT DOCUMENTS

KR    10-2012-0091937 A    8/2012

OTHER PUBLICATIONS

Shen et al, "3D scene reconstruction and object recognition for indoor scene" (published in 2019 Joint International Workshop on Advanced Image Technology (IWAIT) and International Forum on Medical Imaging in Asia (IFMIA), Jan. 2019).*

(Continued)

*Primary Examiner* — Casey L Kretzer
(74) *Attorney, Agent, or Firm* — Rabin & Berdo, P.C.

(57) ABSTRACT

The system includes a metric map creation unit configured to create a metric map using first image data received from a 3D sensor, an image processing unit configured to recognize an object by creating and classifying a point cloud using second image data received from an RGB camera; a probability-based map production unit configured to create an object location map and a spatial semantic map in a probabilistic expression method using a processing result of the image processing unit, a question creation unit configured to extract a portion of high uncertainty about an object class from a produced map on the basis of entropy and ask a user about the portion, and a map update unit configured to receive a response from the user and update a probability distribution for spatial information according to a change in probability distribution for classification of the object.

18 Claims, 10 Drawing Sheets

(51) Int. Cl.
    *G06T 7/77*         (2017.01)
    *G06V 20/10*       (2022.01)
    *G06V 20/64*       (2022.01)

(52) U.S. Cl.
    CPC ......... *G06K 9/6253* (2013.01); *G06K 9/6278* (2013.01); *G06T 7/77* (2017.01); *G06V 20/10* (2022.01); *G06V 20/64* (2022.01); *G06T 2207/20076* (2013.01)

(58) Field of Classification Search
    CPC .................... G06K 9/6278; G06T 7/77; G06T 2207/20076
    See application file for complete search history.

(56) References Cited

OTHER PUBLICATIONS

Soltan et al, "Deep Learning-Based Object Classification and Position Estimation Pipeline for Potential Use in Robotized Pick-and-Place Operations" (published in Robotics, Aug. 2020).*

* cited by examiner

SEMANTIC MAP PRODUCTION SYSTEM AND METHOD

CROSS-REFERENCE TO RELATED APPLICATION

This application claims priority to and the benefit of Korean Patent Application No. 2020-0153563, filed on Nov. 17, 2020, the disclosure of which is incorporated herein by reference in its entirety.

BACKGROUND

1. Field of the Invention

The present invention relates to a semantic map production system and method for producing a semantic map expressed by mapping the meaning of environments to humans through a robot.

2. Discussion of Related Art

Movable and manipulable robots are widely applied in fields such as guidance, transportation, and work assistance and are mainly used in indoor environments. In order for movable and manipulable robots to work without colliding with nearby obstacles, a map of the surrounding environment is required. In recent years, research has been conducted on a technology for a robot to recognize its location through its surrounding environment and the production of a map that enables its location to be determined based on a standard mark for this purpose.

What is expressed by mapping the meaning of environments to humans through a robot is referred to as a semantic map. Generally, a semantic map is produced in the form of expressing the meanings of objects and places (e.g., bedrooms, kitchens, streets, etc.) on a metric map.

Types of maps for robot manipulation include a grid map and a topological map. A grid map is a map in which the entire environment is divided into small grids of a certain size and in which the degree of occupancy of each grid by an object is expressed as a probability value. A topological map is a map in which an environment is expressed with only edges representing connectivity between nodes.

A topological map may have difficulty in location estimation because the amount of metric information given is smaller than that of a grid map. However, a topological map is created with only extracted information on nodes and edges, thus easily expanding to a global map without a large memory and directly utilizing a driving route.

Meanwhile, even with a topological map, meanings may be recognized based on object recognition technology and ontology but may be inaccurately recognized. Thus, there is a need to create a map with probabilistic expressions.

Therefore, the accuracy of a semantic map may be determined based on a probabilistic semantic map, and it is necessary to modify a semantic map by human intervention to increase the accuracy. In particular, for robots to be used in ordinary households, non-expert users must be able to modify maps.

SUMMARY OF THE INVENTION

The present invention is directed to providing a semantic map production system and method capable of updating a semantic map by receiving a response from a user.

According to a first aspect of the present invention, there is provided a semantic map production system for creating a semantic map through a robot that acquires a nearby image using a three-dimensional (3D) image and an RGB camera, the semantic map production system including a metric map creation unit configured to create a metric map using first image data received from the 3D sensor, an image processing unit configured to recognize an object by creating and classifying a point cloud using second image data received from the RGB camera, a probability-based map production unit configured to create an object location map and a spatial semantic map in a probabilistic expression method using a processing result of the image processing unit, a question creation unit configured to extract a portion of high uncertainty about an object class from a produced map on the basis of entropy and ask a user about the portion, and a map update unit configured to receive a response from the user and update a probability distribution for spatial information according to a change in probability distribution for classification of the object.

The probability-based map production unit may estimate a probability distribution of the class and volume of the object recognized by the image processing unit to create the object location map.

Through maximum likelihood estimation, the probability-based map production unit may determine that an object corresponding to a parameter that maximizes the likelihood of the object is a preregistered object and may determine that an object is an unregistered object when the maximum likelihood is less than or equal to a predetermined threshold. The probability-based map production unit may perform a Bayesian update on the probabilistic distribution of the class of the object when the object is determined as a preregistered object and may register the object on the object location map and extract a Gaussian distribution of the object through the mean and variance of a point cloud for the object when the object is determined as an unregistered object.

When no object is recognized by the image processing unit, the probability-based map production unit may create the object location map by extracting an uncertain portion through a 3D layer-wise difference to probabilistically extract a location where an object is likely to be.

The probability-based map production unit may extract data values of a top layer and a bottom layer of a space from image data received from the 3D sensor, express, in the top layer, a difference between the top layer and the bottom layer, classify the point cloud through a clustering algorithm to consider each cluster as an object, compare the object to an object preregistered on the map, and register the object as a new object when a probability for the comparison is less than or equal to a certain value.

The probability-based map production unit may create the spatial semantic map using a semantic network in which a relationship between object types and a connection relationship between an object type and a spatial type are defined and may extract the meaning of a space to which the object belongs after reflecting a weight value determined by the semantic network in the object type and the spatial type and a distance between the object and a nearby object.

The question creation unit of the map correction unit may apply a first weight value to the entropy of the object, apply a second weight value to the spatial node, and ask the user about the type of the object when an objective function value to which the first weight value and the second weight value are applied is higher than a predetermined value.

The map update unit of the map correction unit may perform a Bayesian update on a probabilistic distribution of the class of the object after reflecting a response from the user.

According to a second aspect of the present invention, there is provided a semantic map production method performed by a semantic map production system for creating a semantic map through a robot that acquires a nearby image using a three-dimensional (3D) sensor and an RGB camera, the semantic map production method including operations of: (a) creating a metric map using first image data received from the 3D sensor, (b) recognizing an object by creating and classifying a point cloud using second image data received from the RGB camera, (c) creating an object location map and a spatial semantic map in a probabilistic expression method using a result of the object recognition, (d) extracting a portion of high uncertainty about an object class from a produced map on the basis of entropy and asking a user about the portion, and (e) receiving a response from the user and updating a probability distribution for spatial information according to a change in probability distribution for classification of the object.

Operation (c) may include estimating a probabilistic distribution of the class and volume of the recognized object to create the object location map.

Through maximum likelihood estimation, it may be determined that an object corresponding to a parameter that maximizes the likelihood of the object is a preregistered object, and it may be determined that an object is an unregistered object when the maximum likelihood is less than or equal to a predetermined threshold. A Bayesian update may be performed on the probabilistic distribution of the class of the object when the object is determined as an object preregistered on the semantic map, and the object may be registered on the semantic map and a Gaussian distribution of the object may be extracted through the mean and variance of a point cloud for the object when the object is determined as an object unregistered on the semantic map.

Operation (c) may include, when no object is recognized, extracting an uncertain portion through a 3D layer-wise difference to probabilistically extract a location where an object is likely to be. The semantic map production method may include extracting data values of a top layer and a bottom layer of a space from image data received from the 3D sensor, expressing, in the top layer, a difference between the top layer and the bottom layer, classifying the point cloud through a clustering algorithm to consider each cluster as an object, and comparing the object to an object preregistered on the map and registering the object as a new object when a probability for the comparison is less than or equal to a certain value.

Operation (c) may include creating a spatial semantic map using a semantic network in which a relationship between object types and a connection relationship between an object type and a spatial type are defined and extracting the meaning of a space to which the object belongs after reflecting a weight value determined by the semantic network in the object type and the spatial type and a distance between the object and a nearby object.

Operation (d) may include applying a first weight value to the entropy of the object, applying a second weight value to the spatial node, and asking the user about the type of the object when an objective function value to which the first weight value and the second weight value are applied is higher than a predetermined value.

Operation (e) may include performing a Bayesian update on a probabilistic distribution of the class of the object after reflecting a response from the user.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, detailed contents for practicing the present invention will be described with reference to the accompanying drawings. In the following description of the present invention, detailed descriptions of related well-known functions will be omitted when it is determined that the functions are obvious to those skilled in the art and also may unnecessarily obscure the subject matter of the present invention.

Figure 1:
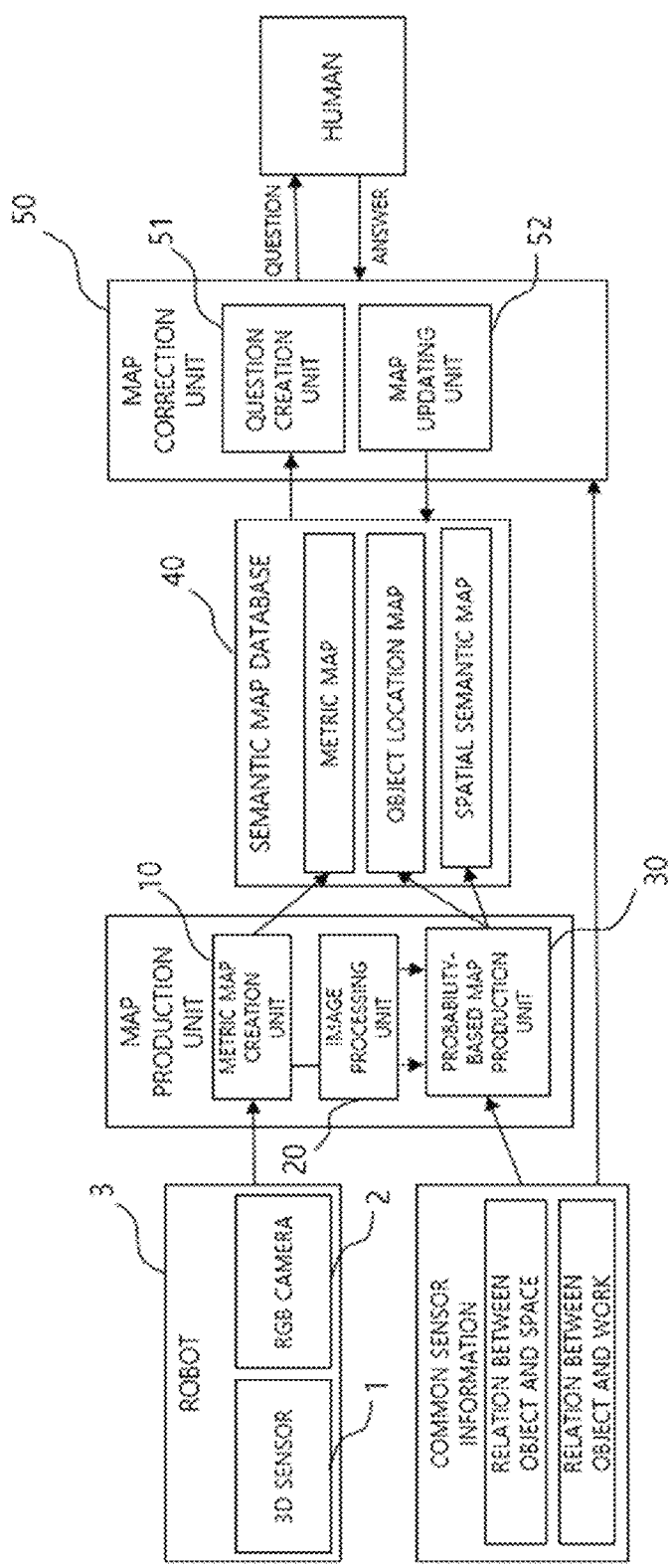
FIG. 1 is a block diagram showing components of a semantic map production system according to the present invention.
Figure 2:
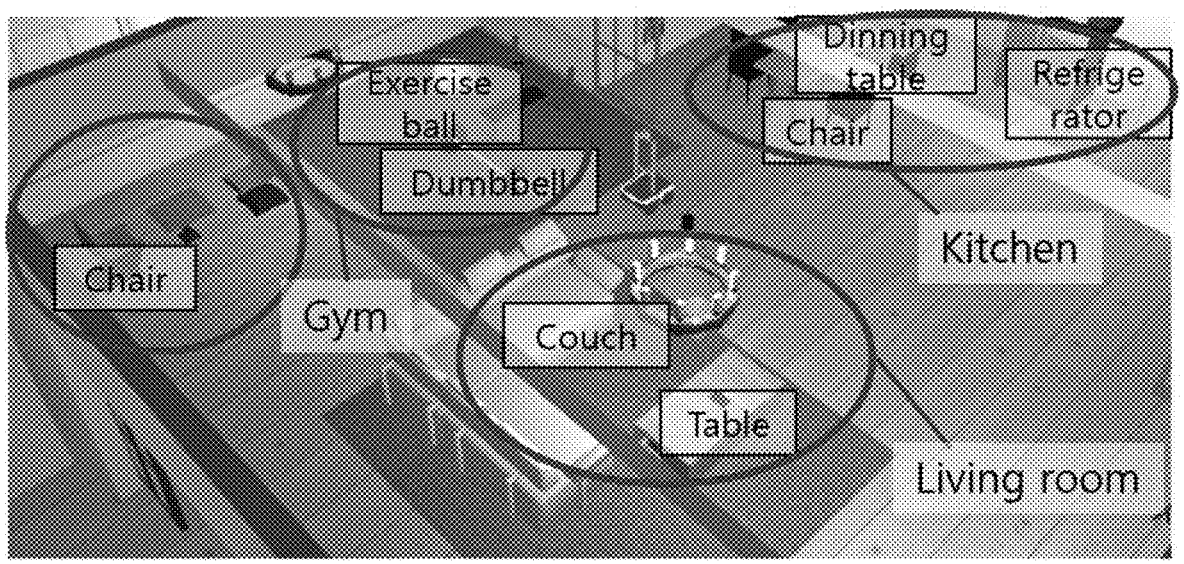
FIG. 2 is a diagram showing a conceptual example of a semantic map created by a semantic map production system according to the present invention.
Figure 3:
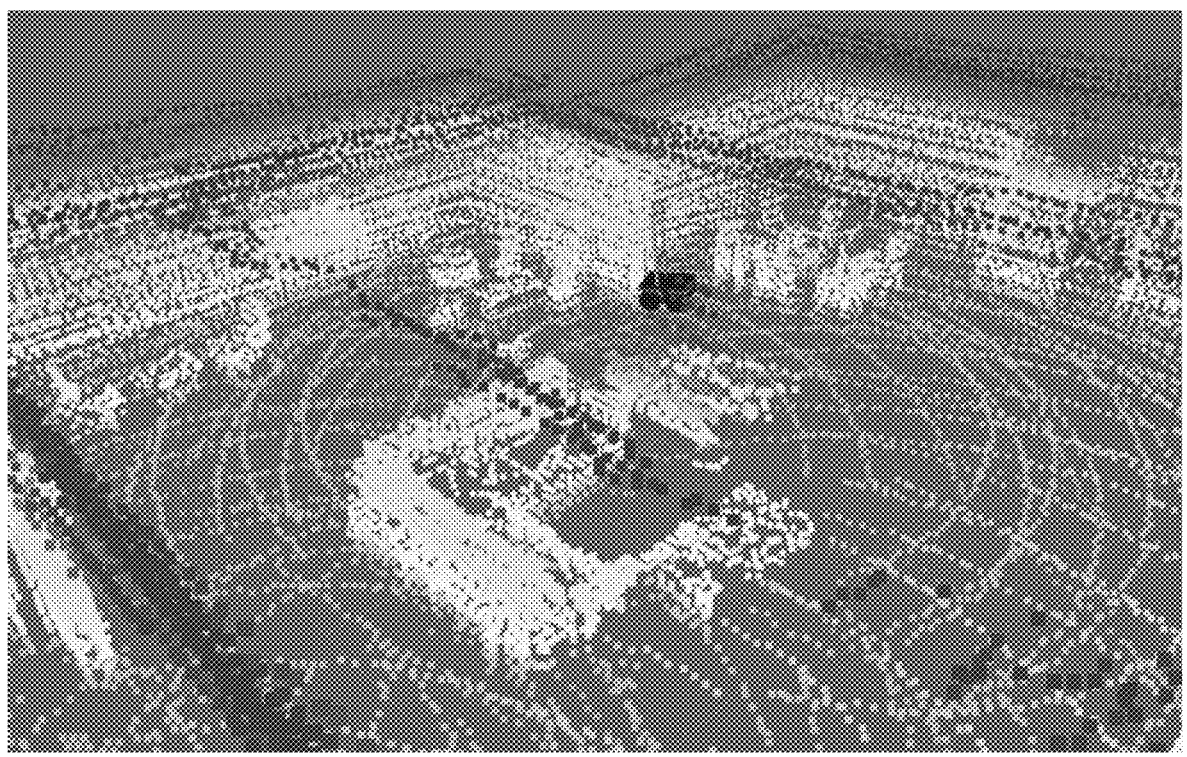
FIG. 3 is a diagram showing a metric map created by a metric map creation unit of FIG. 1.
Figure 4:
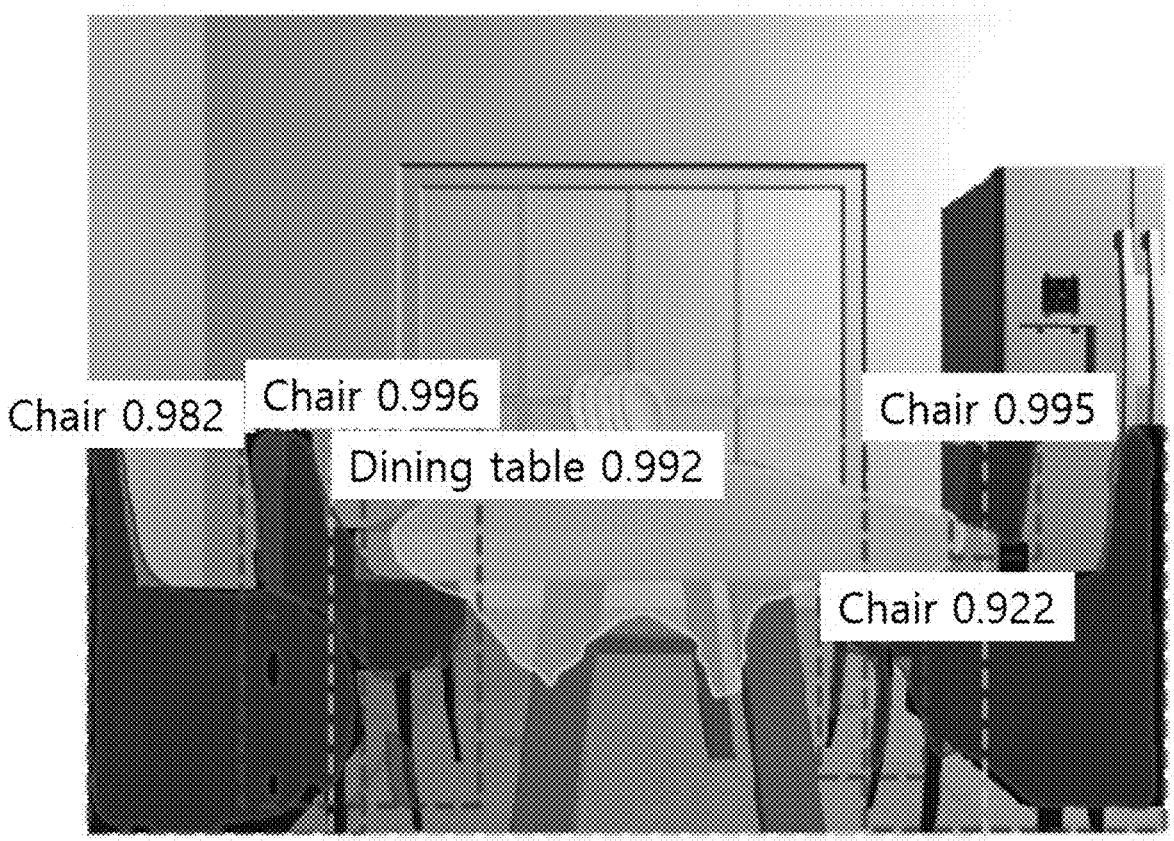
FIG. 4 is a diagram showing a process of performing segmentation by an image processing unit of FIG. 1.
Figure 5:
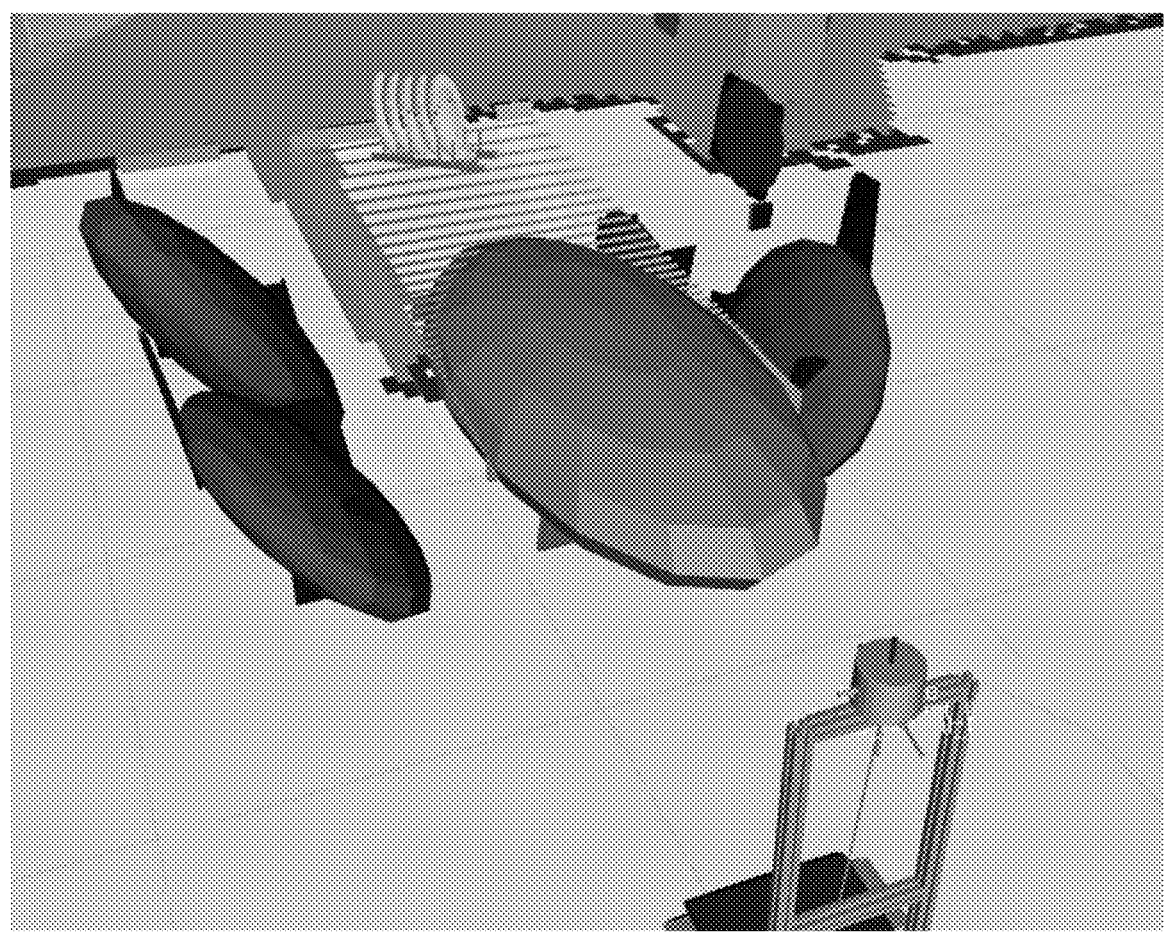
FIG. 5 is a diagram showing a state in which an object is recognized by an image processing unit of FIG. 1.
Figure 6:
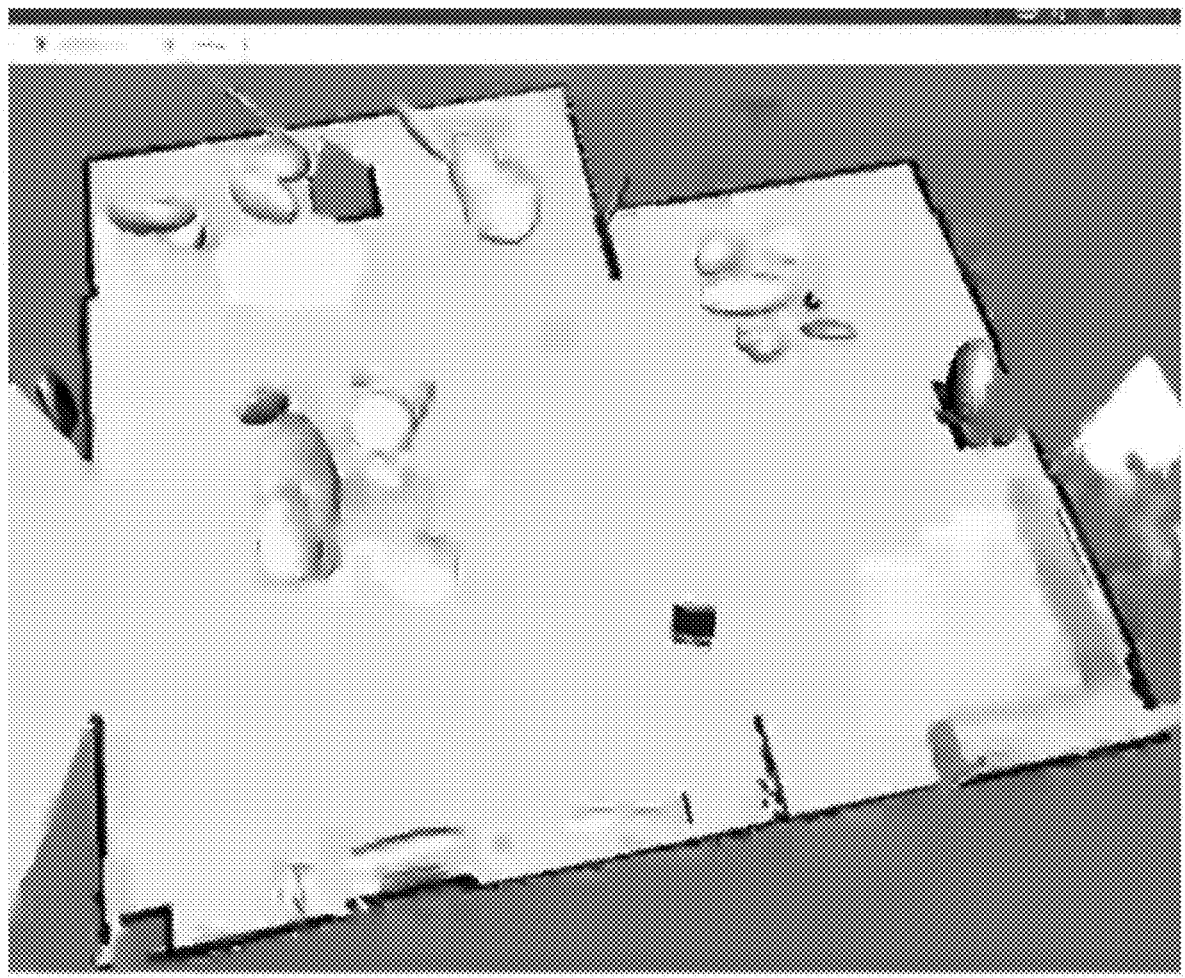
FIG. 6 is a diagram showing a probability-based map produced by a probability-based map production unit of FIG. 1.

FIG. 1 is a block diagram showing components of a semantic map production system according to the present invention. FIG. 2 is a diagram showing a conceptual example of a semantic map created by a semantic map production system according to the present invention. FIG. 3 is a diagram showing a metric map created by a metric map creation unit of FIG. 1. FIG. 4 is a diagram showing a process of performing segmentation by an image processing unit of FIG. 1. FIG. 5 is a diagram showing a state in which an object is recognized by an image processing unit of FIG. 1. FIG. 6 is a diagram showing a probability-based map produced by a probability-based map production unit of FIG. 1.

Referring to FIGS. 1 and 2, a semantic map production system according to the present invention may create a semantic map through a robot 3 for acquiring a nearby image through a 3D sensor 1 and an RGB camera 2. The semantic map includes a metric map having an occupancy grid map or an occupancy voxel map, an object location map, which is a map that stores the volumes and classes of objects (chairs, a dining table, a refrigerator, etc.), and a spatial semantic map, which is a map that stores spaces (a kitchen, a living room, etc.) where the objects are located. Data on the metric map, the object location map, and the spatial semantic map may be stored in the semantic map database 40.

The 3D sensor 1 acquires first image data for creating a metric map, and the RGB camera 2 acquires second image data for creating object location information and spatial semantic information.

The semantic map production system according to the present invention includes a metric map creation unit 10, an image processing unit 20, a probability-based map production unit 30, a semantic map database 40, and a map correction unit 50.

The metric map creation unit 10 creates a metric map using the first image data received from the 3D sensor 1. The 3D sensor 1 may include a 3D laser scanner. The 3D sensor 1 may be provided in conjunction with the metric map creation unit 10. A map production algorithm capable of handling 3D Light Detection and Ranging (Lidar) sensors such as GMapping and Berkeley Localization and Mapping (BLAM) may be applied to the metric map creation unit 10. An indoor metric map created by the 3D sensor 1 may be shown in FIG. 3. The created metric map is stored in the semantic map database 40.

The image processing unit 20 recognizes an object by creating and classifying a point cloud using the second image data received from the RGB camera 2. The RGB camera 2 is provided in conjunction with the image processing unit 20. The image processing unit 20 receives RGB-D image data including depth information from the RGB camera 2 and performs segmentation on the received RGB-D image data as shown in FIG. 4. Then, as shown in FIG. 5, the obtained point cloud may be recognized as an object. The image processing unit 20 may express the volume of an object i as a point cloud $P_i$ of resolution r. Here, object recognition technology using a known point cloud is applicable.

The image processing unit 20 may output a class $c_t$ of an object, a confidence value $p(c_t)$ of an object, and a point cloud $Q_t$ for a segmented object which are included in the second image data at time t.

An object location map in which recognized objects are arranged may be stored in the semantic map database 40.

The probability-based map production unit 30 estimates the probabilistic distribution of the volume and class $c_t$ of the object. As shown in FIG. 6, the probability-based map production unit 30 produces an object location map and a spatial semantic map in a probabilistic expression method by using the processing result of the image processing unit 20. The probability-based map production unit 30 estimates the probabilistic distribution and the Gaussian distribution of objects in the map on the basis of observation.

The probability-based map production unit 30 may approximate the volume of object i into a parameter-based probabilistic distribution (Gaussian distribution, etc.) $p(\phi_k)$ ($\int p(\phi_i)=1$). In addition, $p(\theta_i)$ may be specified by expressing the probabilistic distribution for class $\theta_i$ of each object as a categorical distribution $\Sigma_{i=1}^{n} p(\theta_i)=1$ should be satisfied). In this case, the number of types of classes is $n_c$.

An object location map production method according to the probability-based map production unit 30 may be classified into a case in which the image processing unit 20 recognizes an object and a case in which there is no object recognized by the image processing unit 20 depending on the processing result of the image processing unit 20. The case in which the image processing unit 20 recognizes an object may be classified into a case in which a new object that has not yet been registered on the map is recognized and a case in which an object that is preregistered on the map is recognized.

The probability-based map production unit 30 may determine whether an object recognized using an object searcher is an object registered on the map. The probability-based map production unit 30 determines whether the recognized object is an object registered on the map, returns an index of the registered object when the object is registered, and returns a new index by adding one to the number of previously registered objects when the object is a new object.

The probability-based map production unit 30 may determine that an object corresponding to a parameter that maximizes the likelihood of an object is a preregistered object using maximum likelihood estimation. Meanwhile, the probability-based map production unit 30 may determine that an object having a maximum likelihood equal to or less than a predetermined threshold is an unregistered object.

The probability-based map production unit 30 determines that i that maximizes the likelihood $p(z_t|\theta_i, \phi_i)$ of the object with respect to an observation parameter $z_t$ is a preregistered object and determines that the recognized object is a new object when the maximum $p(z_t|\theta_i, \phi_i)$ does not exceed a certain threshold. The observation parameter $z_t$ is defined as $\{c_t, Q_t\}$. $c_t$ denotes the class of an object obtained by the image processing unit 20. $Q_t$ denotes a point cloud, and $Q_{0:t}$ denotes a point cloud observed from 0 to t.

When it is determined that an object is preregistered on a semantic map, the probability-based map production unit 30 may perform a Bayesian update on the probabilistic distribution of the class of the object. When an object registered on the map is recognized, the probability-based map production unit 30 updates parameters $p(\theta_i)$ and $\phi_i$. The probability-based map production unit 30 performs the Bayesian update on $p(\theta_i)$ and $p(\phi_i)$.

Information regarding the class of the object may be updated in the Bayesian fashion through the following Equation.

$$p(\theta_i | c_{0:t}) = \frac{1}{\eta} p(c_t | \theta_i) p(\theta_i | c_{0:t-1}) \qquad [\text{Equation 1}]$$

An object volume parameter $\phi_i$ may be updated to the mean and variance of $P_i$ and $Q_i$, which are point clouds that are stored.

When it is determined that an object is not registered on the semantic map, the probability-based map production unit 30 registers the object on the semantic map and extracts the probabilistic distribution of a point cloud for the object. The registered object information may be stored in the semantic map database 40.

That is, when a new object is recognized and the actual class of the object is $\theta_i$, the probability that the observed class of the object is $c_i$ is as follows.

$$p(\theta_i \mid c_t) = \begin{cases} p(c_t), & \text{if } \theta_i = c_t \\ \dfrac{1 - p(c_t)}{n_c - 1}, & o.w. \end{cases} \quad \text{[Equation 2]}$$

The probability-based map production unit 30 may extract $\phi_i$ of through the point cloud $Q_t$.

When there is no object recognized by the image processing unit 20, the probability-based map production unit 30 probabilistically extracts a location where the object is likely to be.

Figure 7:
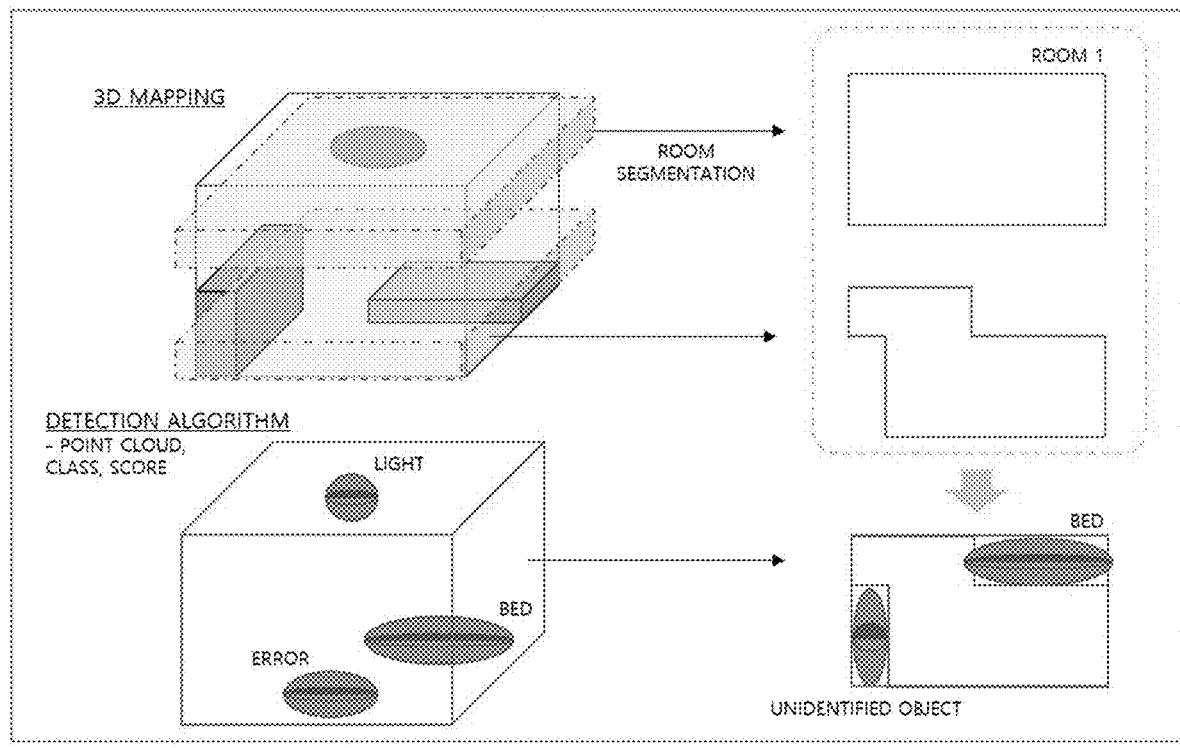
FIG. 7 is a conceptual diagram illustrating a process of probabilistically extracting a location where an object is likely to be.
Figure 8:
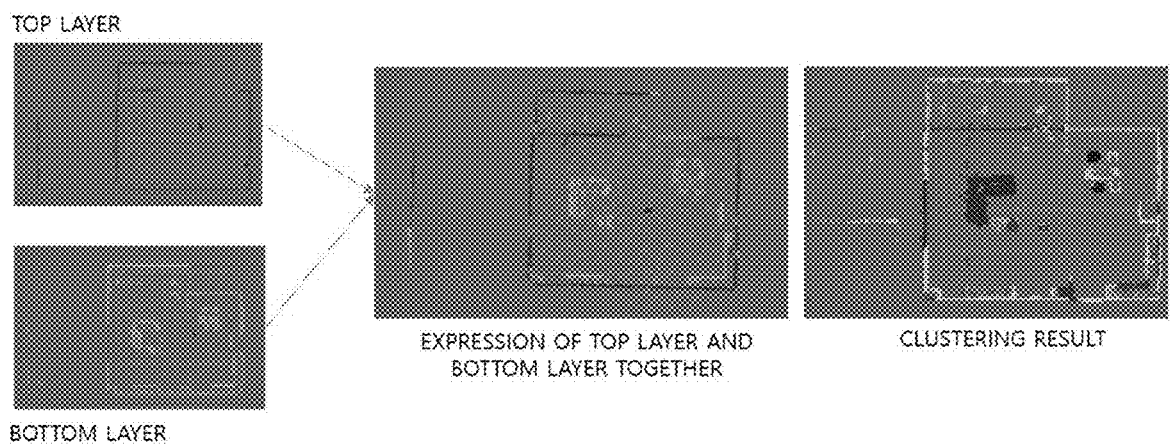
FIG. 8 is a diagram illustrating a process in which a probability-based map production unit extracts an uncertain part through a 3D layer-wise difference in an indoor space.

FIG. 7 is a conceptual diagram illustrating a process of probabilistically extracting a location where an object is likely to be. FIG. 8 is a diagram illustrating a process in which a probability-based map production unit extracts an uncertain part through a 3D layer-wise difference in an indoor space.

Referring to FIG. 7, when no object is recognized by the image processing unit 20, the probability-based map production unit 30 may probabilistically extract a location where any object is likely to be. The probability-based map production unit 30 extracts an uncertain part through a 3D layer-wise difference. The detailed process is as follows.

Referring to FIG. 8, the probability-based map production unit 30 extracts data values of a top layer and a bottom layer of an indoor space from image data received from the 3D sensor 1. Subsequently, the probability-based map production unit 30 may express, in the top layer, a difference between the top layer and the bottom layer.

The probability-based map production unit 30 classifies point clouds through a clustering algorithm (DBSCAN, WARD, Spectral clustering, etc.), and considers each cluster as an object. In this case, there may be several objects, and each 2D point cloud is shown as an observed point cloud.

Subsequently, the probability-based map production unit 30 compares each cluster considered as an object to an object preregistered on the map and may register the new object on the map when the probability is less than or equal to a predetermined value.

Specifically, the probability-based map production unit 30 may determine whether a cluster is a preregistered object on the basis of an extracted cluster (similar to the above-described object searcher). Assuming that only 2D points being extracted among probability parameters of a preregistered object is $\overline{\phi}_i$, it is considered that maximizing $p(\overline{Q}_j|\overline{\phi}_i)$ is an object such as $p(\overline{Q}_j|\overline{\phi}_i)$. When does not exceed a certain value, the object is not preregistered, and thus the probability-based map production unit 30 registers the object as a new object.

$p(\theta_i)$, which is a parameter of an object model to be newly registered, follows a uniform distribution, and may be computed from the observed point cloud $\overline{Q}_j$. An image of the new object may be stored in the semantic map database 40.

Next, the probability-based map production unit producing a spatial semantic map using common-sense information will be described in detail below.

Figure 9A:
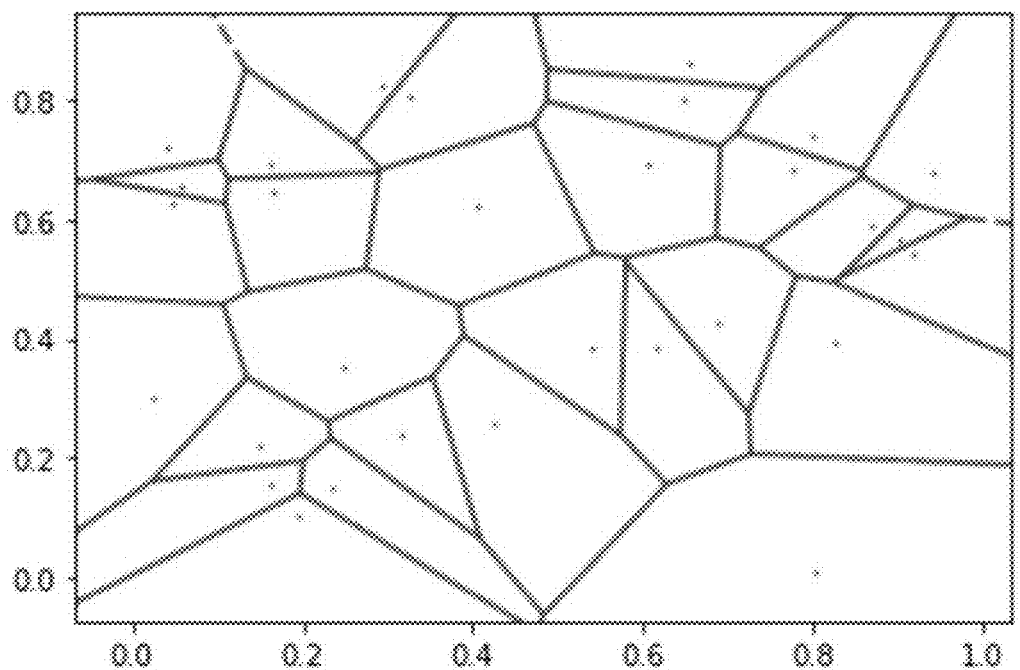
FIGS. 9A and 9B are diagrams illustrating that a probability-based map production unit of FIG. 1 produces a spatial semantic map using common-sense information.
Figure 9B:
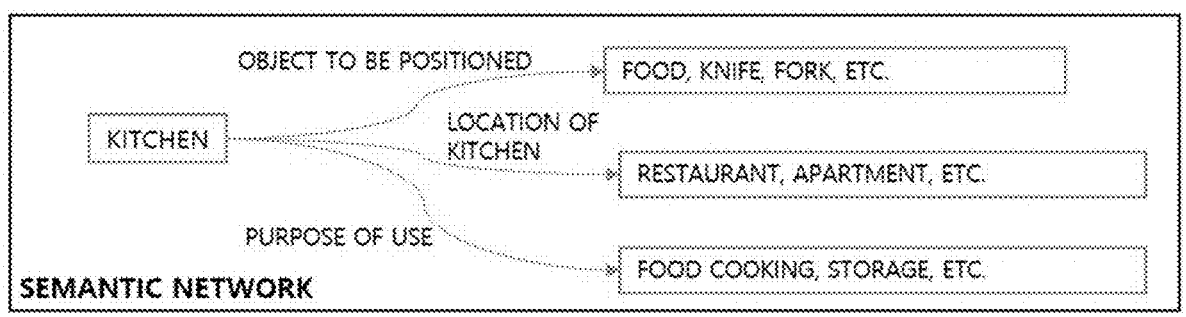

FIGS. 9A and 9B are diagrams illustrating that a probability-based map production unit of FIG. 1 produces a spatial semantic map using common-sense information.

Referring to FIGS. 9A and 9B, the probability-based map production unit 30 uses a semantic network in which a connection between object types and a connection relationship between each object type and a spatial type are defined. By reflecting weight values determined by the semantic network to a distance between a recognized object and a nearby object and to a recognized object type and a spatial type, the probability-based map production unit 30 may estimate a spatial type to which the recognized object belongs.

The detailed description of spatial semantic map production using common-sense information is as follows.

The probability-based map production unit 30 may extract the meaning of a space from a nearby object by using information about universal human knowledge, such as ConceptNet. For example, when a refrigerator, a sink, and a dining table are close to each other in one space, the probability-based map production unit 30 may infer that the space is a kitchen. Classes for spaces include a kitchen, a living room, a bedroom, a utility room, and a balcony.

The spatial semantic map is a topological graph composed of a node V and an edge E and is expressed as G=(V, E). Each node $v \in V$ stores the location $p_v$ and the class $c_v$ of each node.

A process of creating a spatial semantic map will be described in detail below.

The location of each node is created through an algorithm based on sampling (Voronoi, etc.) as shown in FIG. 9A. Assuming that nearby objects are $o_1, o_2, \ldots o_n$, the probabilistic distribution for $c_v$ is as follows.

$$p(c_p \mid o_1, \ldots, o_n) = \frac{1}{\eta} \sum_{i=1}^{n} p(c_v \mid o_i) \quad \text{[Equation 3]}$$

Here, $p(c_v|o_i)$ denotes the probability that an object $o_i$ is in a space $c_v$. $p(c_v|o_i)$ is extracted from a semantic network such as ConceptNet in which common-sense information becomes knowledge. The semantic network has a semantic relationship between words and also a confidence score. As shown in FIG. 9B, in the semantic network, for example, common-sense information indicating that objects such as food, knives, and forks are located in the kitchen, common-sense information indicating that the kitchen is located in a restaurant or apartment, and common-sense information indicating that the kitchen is used to cook or store food are linked to each other through a semantic relationship.)

$p(c_v|o_i)$ is defined as follows.

$$p(c_v \mid o_i) = \frac{1}{\eta'} \exp\left(-\frac{\text{distance}}{\text{const}}\right) S(\text{confidence score}) \quad \text{[Equation 4]}$$

Here, "distance" is a distance between an object and node v, "const" is defined as a constant, and S is an error function, which is modeled so that a probability value increases as the "confidence score" increases and decreases as the distance increases.

Figure 10:
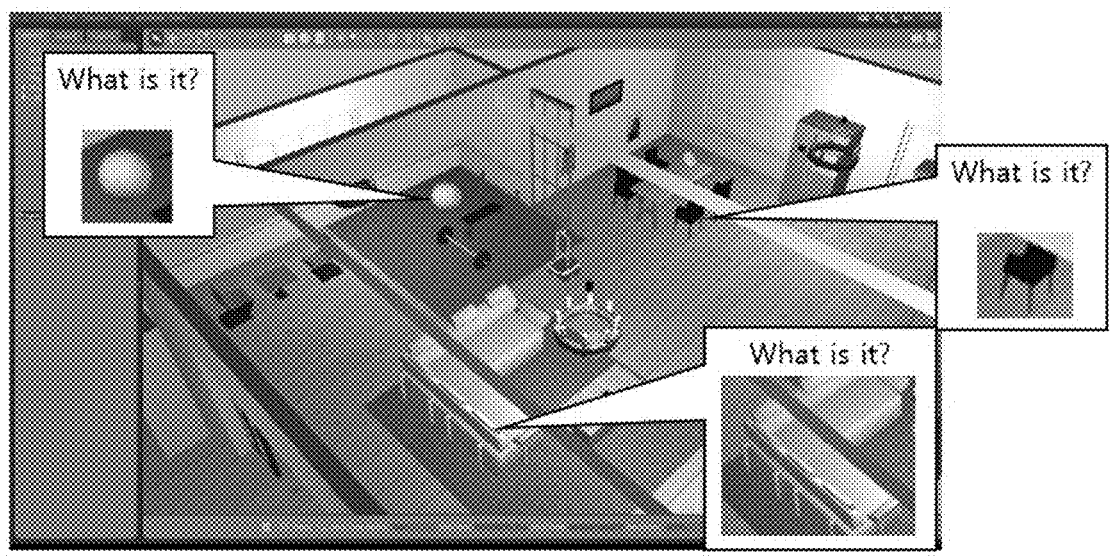
FIG. 10 is a diagram showing a state in which a map correction unit of FIG. 1 asks a user about a portion of high uncertainty in a pre-produced map.
Figure 11:
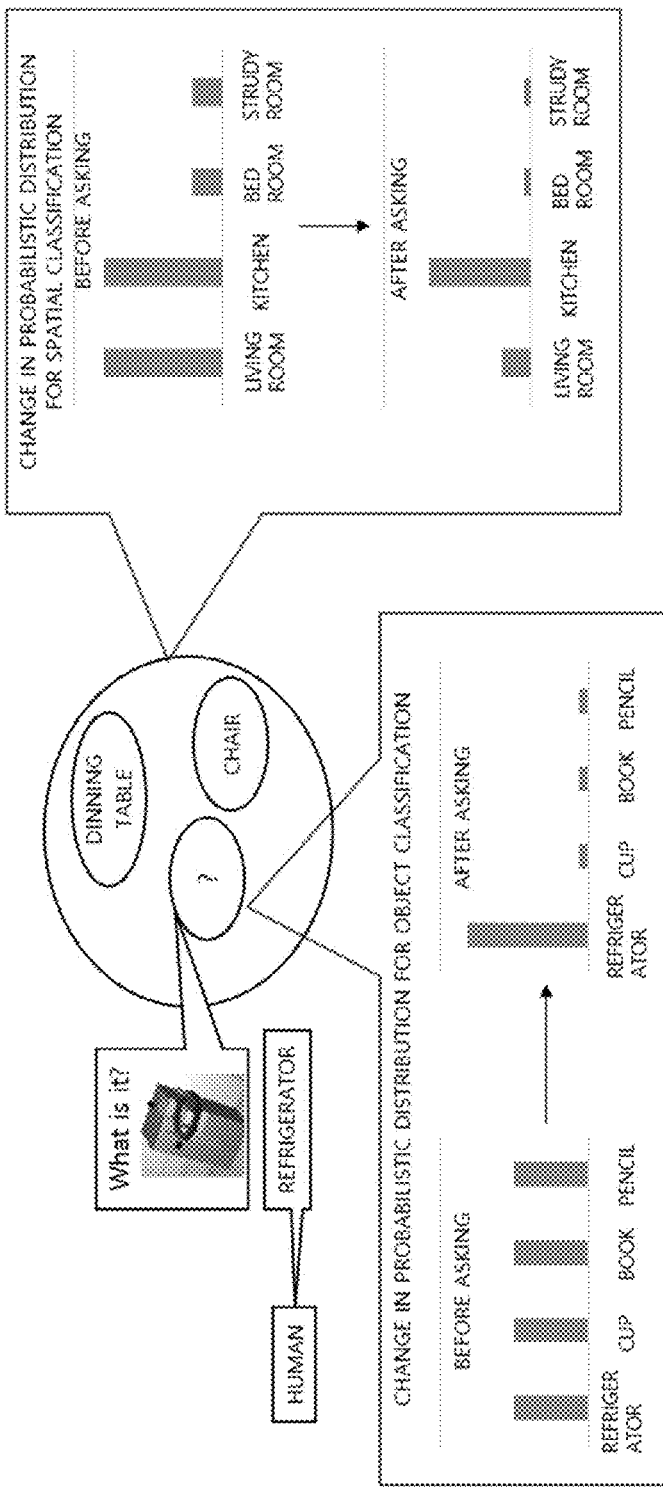
FIG. 11 is a diagram illustrating a change in which a map correction unit of FIG. 1 updates a probabilistic distribution for spatial information according to a change in probabilistic distribution for classification of an object.

FIG. 10 is a diagram showing a state in which a map correction unit of FIG. 1 asks a user about a portion of high uncertainty in a preproduced map. FIG. 11 is a diagram illustrating a change in which a map correction unit of FIG. 1 updates a probabilistic distribution for spatial information according to a change in probabilistic distribution for classification of an object.

Referring to FIG. 10, the map correction unit 50 determines whether to ask a user about an object type according to an objective function, which is a weighted sum between the entropy of the object and the entropy of a spatial node near the node, receives a response from the user, and updates the probabilistic distribution of classes of the object. The map correction unit 50 includes a question creation unit 51 and a map update unit 52.

The question creation unit 51 extracts a portion of high uncertainty about the class of an object from the produced map on the basis of entropy and asks the user about the portion. The question creation unit 51 may apply a first weight value to the entropy of the object, apply a second weight value to the spatial node, and ask the user about the type of the object when an objective function value to which the first weight value and the second weight value are applied is higher than a predetermined value.

The question creation unit 51 defines the objective function for asking the user using the weighted sum of the entropy of the object and the entropy of the spatial node near the object as follows.

$$f(\theta_i) = \alpha H(\theta i) + \beta E_{e_p \in Near(object)}[H(c_v)] \quad \text{[Equation 5]}$$

The entropy may be computed as follows.

$$H(x) = -\sum_{i=1}^{n} p(x)\log p(x) \quad \text{[Equation 6]}$$

The question creation unit 51 adjusts the importance between the entropy of the object itself and the entropy of the space near the object with $\alpha$ and $\beta$. The question creation unit 51 asks a question such as "What is it?" about an object that maximizes the objective function through $i^* = \text{ArgMax}_i\, f(\theta_i)$ using an image stored when the map is produced.

The map update unit 52 of the map correction unit 50 may perform the Bayesian update on the probabilistic distribution of the classes of the object after reflecting the response from the user. The map update unit 52 may obtain a human answer to the object and update the categorical distribution of classification information of the object according to the Bayesian rule.

Referring to FIG. 11, for example, when the question creation unit 51 asks a user what an object is and the user answers that the object is a refrigerator, the map update unit 52 may perform an update such that the refrigerator has the highest probabilistic distribution for object classification and the kitchen has the highest change in probabilistic distribution for spatial classification.

The answer to the question is denoted by c, which is the class c of the observed object. According to the Bayesian rule, the probabilistic distribution for the class of the object may be updated as follows.

$$p(\theta_i \mid c) = \frac{1}{\eta} p(c \mid \theta_i) p(\theta_i) \quad \text{[Equation 7]}$$

$p(\theta_i)$ is a probabilistic distribution before asking the question, and $p(\theta_i | c)$ is a probabilistic distribution after finding the answer. $p(c|\theta_i)$ can be obtained through the answer to the question and follows the equation below.

$$p(c \mid \theta_i) = \begin{cases} \epsilon, & \text{if } \theta_i = c \\ \frac{1-e}{n_c - 1}, & o.w. \end{cases} \quad \text{[Equation 8]}$$

$\epsilon$ is a value close to one, and it can be assumed that a user gives a correct answer.

According to the present invention, it is possible to create a semantic map by combining cognitive information obtained through a robot and common-sense information obtained through a user.

Also, it is possible to express a semantic map with a probability-based hierarchical structure, create a question that can effectively reduce the uncertainty of a semantic map, and update the semantic map after reflecting a human answer to the question.

The scope of the present invention is not limited to the description and expression of the embodiments explicitly described above. In addition, the scope of the present invention cannot be limited due to obvious changes or substitutions in the technical field to which the present invention pertains.

What is claimed is:

1. A semantic map production system for creating a semantic map through a robot that acquires a nearby image using a three-dimensional (3D) sensor and an RGB camera, the semantic map production system comprising:
   a metric map creation unit configured to create a metric map using first image data received from the 3D sensor;
   an image processing unit configured to recognize an object by creating and classifying a point cloud using second image data received from the RGB camera;
   a probability-based map production unit configured to create an object location map and a spatial semantic map in a probabilistic expression method using a processing result of the image processing unit; and
   a map correction unit comprising:
   a question creation unit configured to extract a portion of high uncertainty about an object class from a produced map on the basis of entropy and ask a user about the portion; and
   a map update unit configured to receive a response from the user and update a probabilistic distribution for spatial information according to a change in probabilistic distribution for classification of the object.

2. The semantic map production system of claim 1, wherein the probability-based map production unit estimates a probabilistic distribution of the class and volume of the object recognized by the image processing unit to create the object location map.

3. The semantic map production system of claim 2, wherein, through maximum likelihood estimation, the probability-based map production unit determines that an object corresponding to a parameter that maximizes the likelihood of the object is a preregistered object and determines that an object is an unregistered object when the maximum likelihood is less than or equal to a predetermined threshold.

4. The semantic map production system of claim 3, wherein the probability-based map production unit is configured to:
   perform a Bayesian update on the probabilistic distribution of the class of the object when the object is determined as a preregistered object; and
   register the object on the object location map and extract a Gaussian distribution of the object through the mean and variance of a point cloud for the object when the object is determined as an object unregistered on the semantic map.

5. The semantic map production system of claim 1, wherein when no object is recognized by the image processing unit, the probability-based map production unit creates the object location map by extracting an uncertain portion through a 3D layer-wise difference to probabilistically extract a location where an object is likely to be.

6. The semantic map production system of claim 5, wherein the probability-based map production unit extracts data values of a top layer and a bottom layer of a space from image data received from the 3D sensor, expresses, in the top layer, a difference between the top layer and the bottom layer, classifies the point cloud through a clustering algorithm to consider each cluster as an object, compares the object to an object preregistered on the map, and registers the object as a new object when a probability for the comparison is less than or equal to a certain value.

7. The semantic map production system of claim 1, wherein the probability-based map production unit creates the spatial semantic map using a semantic network in which a relationship between object types and a connection relationship between an object type and a spatial type are defined, and extracts the meaning of a space to which the object belongs after reflecting a weight value determined by the semantic network in the object type and the spatial type and a distance between the object and a nearby object.

8. The semantic map production system of claim 1, wherein the question creation unit of the map correction unit applies a first weight value to the entropy of the object, applies a second weight value to the spatial node, and asks the user about the type of the object when an objective function value to which the first weight value and the second weight value are applied is higher than a predetermined value.

9. The semantic map production system of claim 1, wherein the map update unit of the map correction unit performs a Bayesian update on a probabilistic distribution of the class of the object after reflecting a response from the user.

10. A semantic map production method performed by a semantic map production system for creating a semantic map through a robot that acquires a nearby image using a three-dimensional (3D) sensor and an RGB camera, the semantic map production method comprising operations of:
   (a) creating a metric map using first image data received from the 3D sensor;
   (b) recognizing an object by creating and classifying a point cloud using second image data received from the RGB camera;
   (c) creating an object location map and a spatial semantic map in a probabilistic expression method using a result of the object recognition;
   (d) extracting a portion of high uncertainty about an object class from a produced map on the basis of entropy and asking a user about the portion; and
   (e) receiving a response from the user and updating a probabilistic distribution for spatial information according to a change in probabilistic distribution for classification of the object.

11. The semantic map production method of claim 10, wherein operation (c) comprises estimating a probabilistic distribution of the class and volume of the recognized object to create the object location map.

12. The semantic map production method of claim 11, wherein through maximum likelihood estimation, it is determined that an object corresponding to a parameter that maximizes the likelihood of the object is a preregistered object, and it is determined that an object is an unregistered object when the maximum likelihood is less than or equal to a predetermined threshold.

13. The semantic map production method of claim 12, wherein
   a Bayesian update is performed on the probabilistic distribution of the class of the object when the object is determined as an object preregistered on the semantic map, and
   the object is registered on the semantic map and a Gaussian distribution of the object is extracted through the mean and variance of a point cloud for the object when the object is determined as an object unregistered on the semantic map.

14. The semantic map production method of claim 10, wherein operation (c) comprises, when no object is recognized, creating the object location map by extracting an uncertain portion through a 3D layer-wise difference to probabilistically extract a location where an object is likely to be.

15. The semantic map production method of claim 14, further comprising:
   extracting data values of a top layer and a bottom layer of a space from image data received from the 3D sensor;
   expressing, in the top layer, a difference between the top layer and the bottom layer;
   classifying the point cloud through a clustering algorithm to consider each cluster as an object; and
   comparing the object to an object preregistered on the map and registering the object as a new object when a probability for the comparison is less than or equal to a certain value.

16. The semantic map production method of claim 10, wherein operation (c) comprises creating the spatial semantic map using a semantic network in which a relationship between object types and a connection relationship between an object type and a spatial type are defined and extracting the meaning of a space to which the object belongs after reflecting a weight value determined by the semantic network in the object type and the spatial type and a distance between the object and a nearby object.

17. The semantic map production method of claim 10, wherein operation (d) comprises applying a first weight value to the entropy of the object, applying a second weight value to the spatial node, and asking the user about the type of the object when an objective function value to which the first weight value and the second weight value are applied is higher than a predetermined value.

18. The semantic map production method of claim 10, wherein operation (e) comprises performing a Bayesian update on a probabilistic distribution of the class of the object after reflecting a response from the user.

* * * * *